US012650443B2

(12) United States Patent
Walter

(10) Patent No.: US 12,650,443 B2
(45) Date of Patent: Jun. 9, 2026

(54) DETECTION DEVICE FOR SCANNING PROBE MICROSCOPE

(71) Applicant: VMICRO, Villeneuve d'Ascq (FR)

(72) Inventor: Benjamin Walter, Lille (FR)

(73) Assignee: VMICRO, Villeneuve d'Ascq (FR)

( * ) Notice: Subject to any disclaimer, the term of this patent is extended or adjusted under 35 U.S.C. 154(b) by 748 days.

(21) Appl. No.: 17/909,740

(22) PCT Filed: Oct. 28, 2020

(86) PCT No.: PCT/EP2020/080314
§ 371 (c)(1),
(2) Date: Feb. 24, 2023

(87) PCT Pub. No.: WO2021/180347
PCT Pub. Date: Sep. 16, 2021

(65) Prior Publication Data
US 2023/0184809 A1 Jun. 15, 2023

(30) Foreign Application Priority Data

Mar. 9, 2020 (FR) ...................................... 2002307

(51) Int. Cl.
*G01Q 70/16* (2010.01)
*G01Q 70/02* (2010.01)
*G01Q 70/08* (2010.01)
(52) U.S. Cl.
CPC ............. *G01Q 70/16* (2013.01); *G01Q 70/02* (2013.01); *G01Q 70/08* (2013.01)
(58) Field of Classification Search
CPC ....... G01Q 70/02; G01Q 70/00; G01Q 70/168
See application file for complete search history.

(56) References Cited

U.S. PATENT DOCUMENTS 5,705,814 A * 1/1998 Young ..................... G01Q 30/06
250/423 P
6,176,122 B1 1/2001 Shimizu et al.
(Continued)

FOREIGN PATENT DOCUMENTS

DE 102015210159 A1 12/2016
EP 0444697 A2 9/1991
(Continued)

OTHER PUBLICATIONS

F. J. Giessibl and C. F. Quate , "Exploring the nanoworld with atomic force microscopy", Physics Today, Dec. 2006, pp. 44-50.
(Continued)

*Primary Examiner* — Daniel S Larkin
(74) *Attorney, Agent, or Firm* — CUSHMAN PARTNERS LLC

(57) ABSTRACT

A detection device to be inserted in a holder of a scanning probe microscope is provided. The detection device comprises a probe comprising a support, a lever extending from the support, a tip positioned at one end of the lever, opposite from said support. The probe has dimensions that are small in comparison with the holder and the detection device comprises an adapter secured to the probe so as to adapt said probe to fit the holder. The adapter is secured to the probe by bonding comprising at least one adhesive or by assembly comprising a filler material used to secure said adapter to said probe during a brazing operation.

13 Claims, 9 Drawing Sheets

(56)                    References Cited

U.S. PATENT DOCUMENTS

| | | | | |
|---|---|---|---|---|
| 6,415,653 | B1 * | 7/2002 | Matsuyama | ........... G01Q 70/10 |
| | | | | 216/2 |
| 10,578,644 | B2 | 3/2020 | Baur et al. | |

FOREIGN PATENT DOCUMENTS

| | | | | | |
|---|---|---|---|---|---|
| EP | 1544865 | A1 | | 6/2005 | |
| JP | 2008003034 | A | * | 1/2008 | |
| KR | 20180137425 | A | * | 12/2018 | ........ A61M 37/0015 |
| WO | 9318525 | A1 | | 9/1993 | |

OTHER PUBLICATIONS

[Retrieved on Nov. 21, 2024]. Retrieved from the Internet: <URL: https://www.larousse.fr/dictionnaires/francais/berceau/8832.

* cited by examiner

[Fig 1]
[Fig 2]
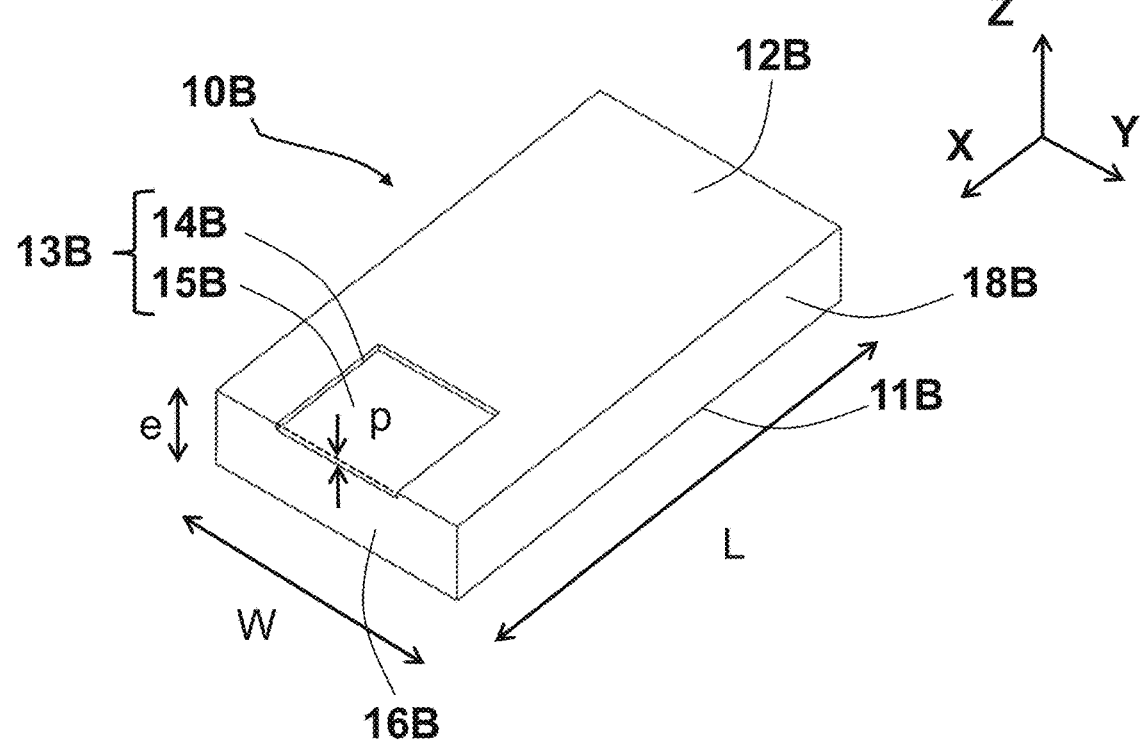

[Fig 3]
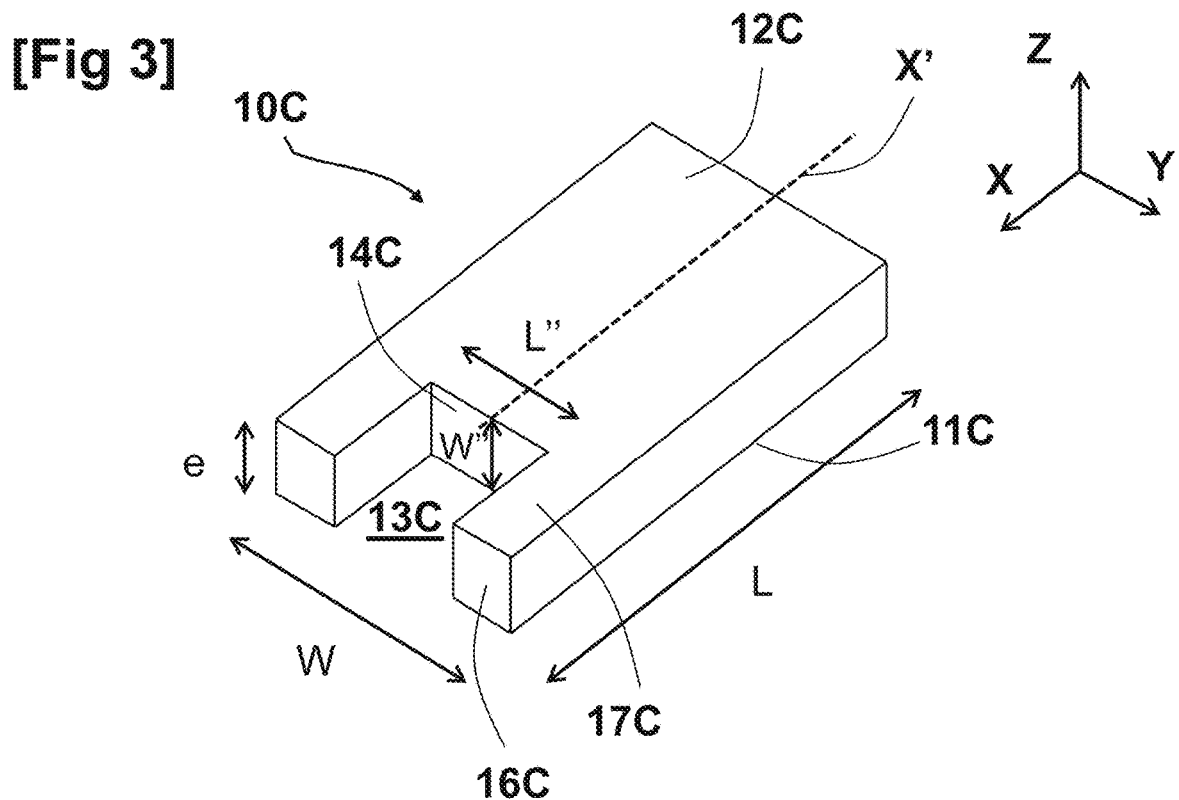
[Fig 4]
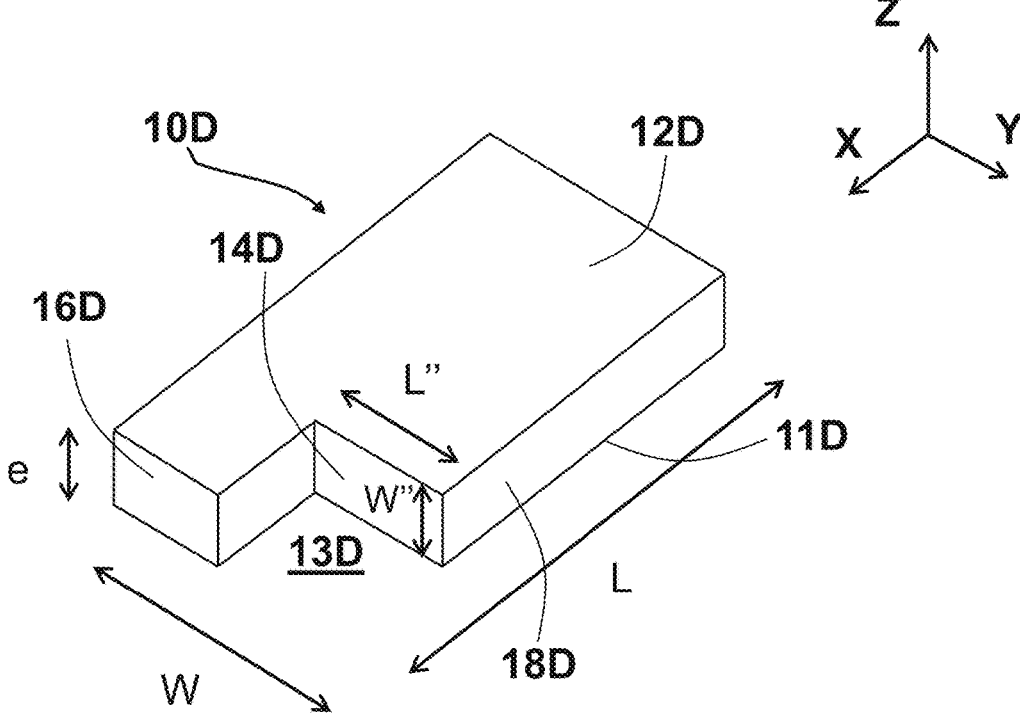

[Fig 5]
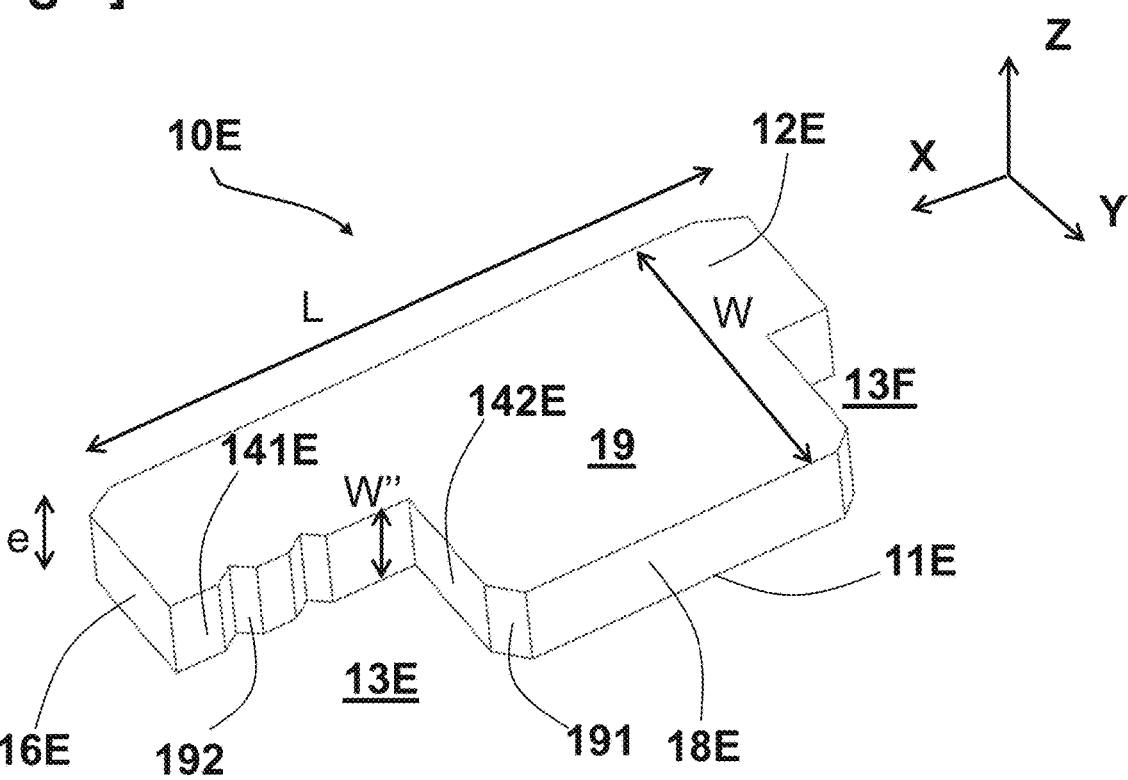
[Fig 6]
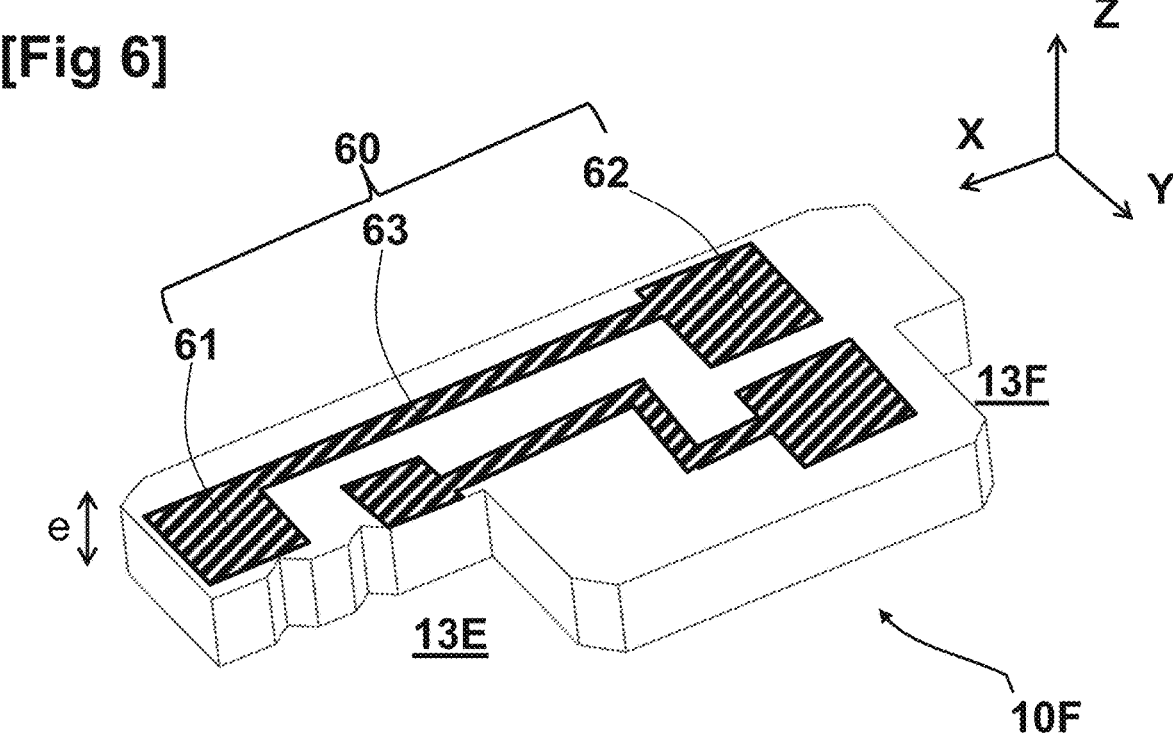

[Fig 7]
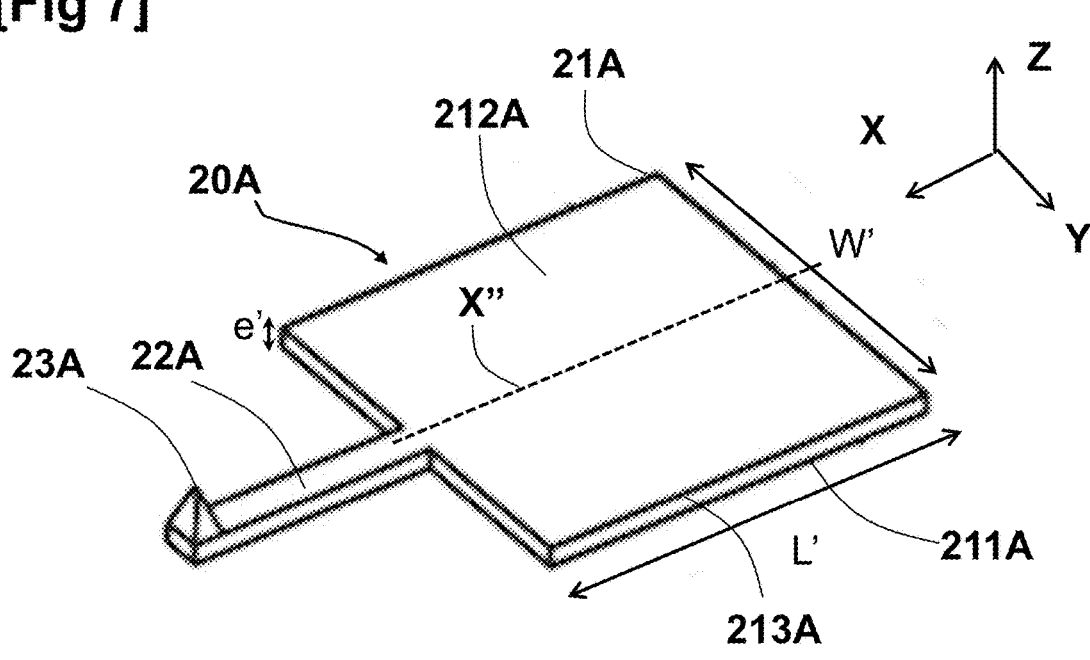
[Fig 8]
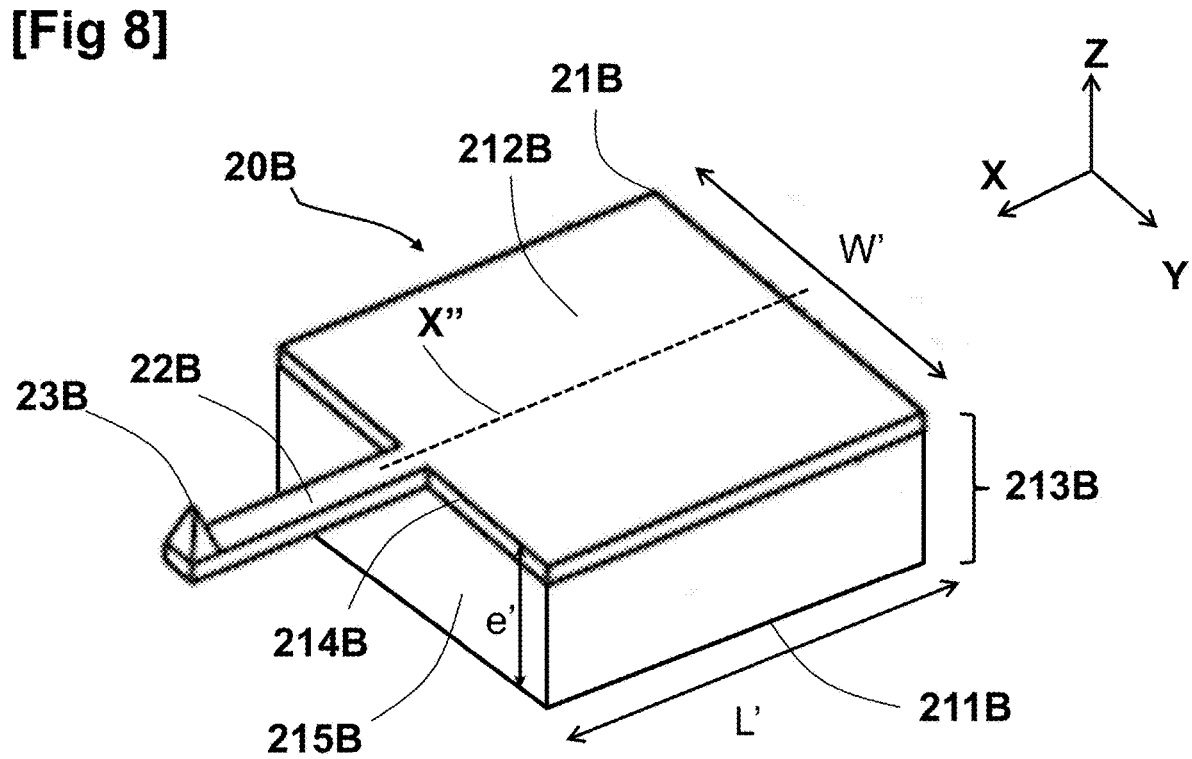

[Fig 9]
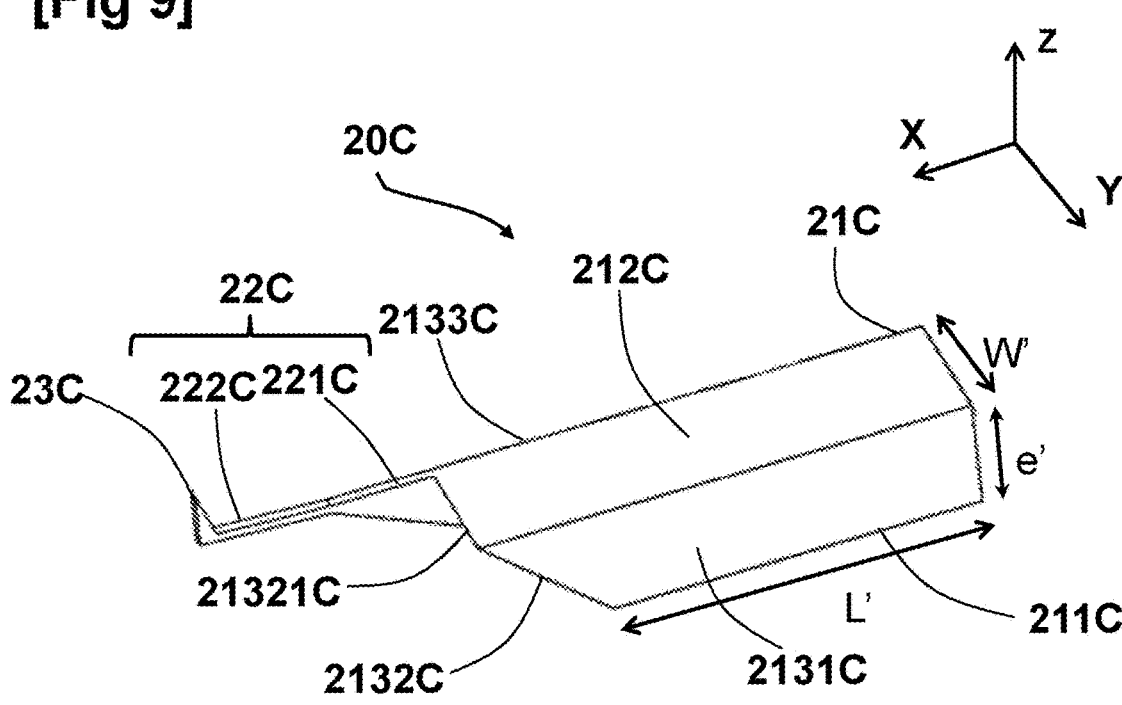
[Fig. 10]
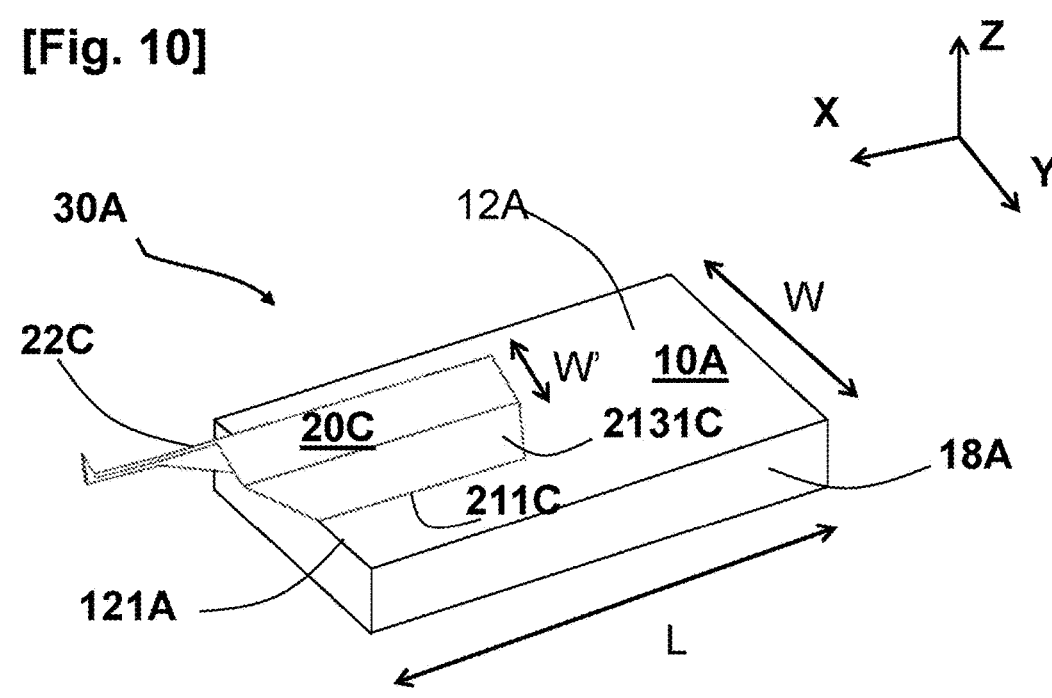

[Fig 11]
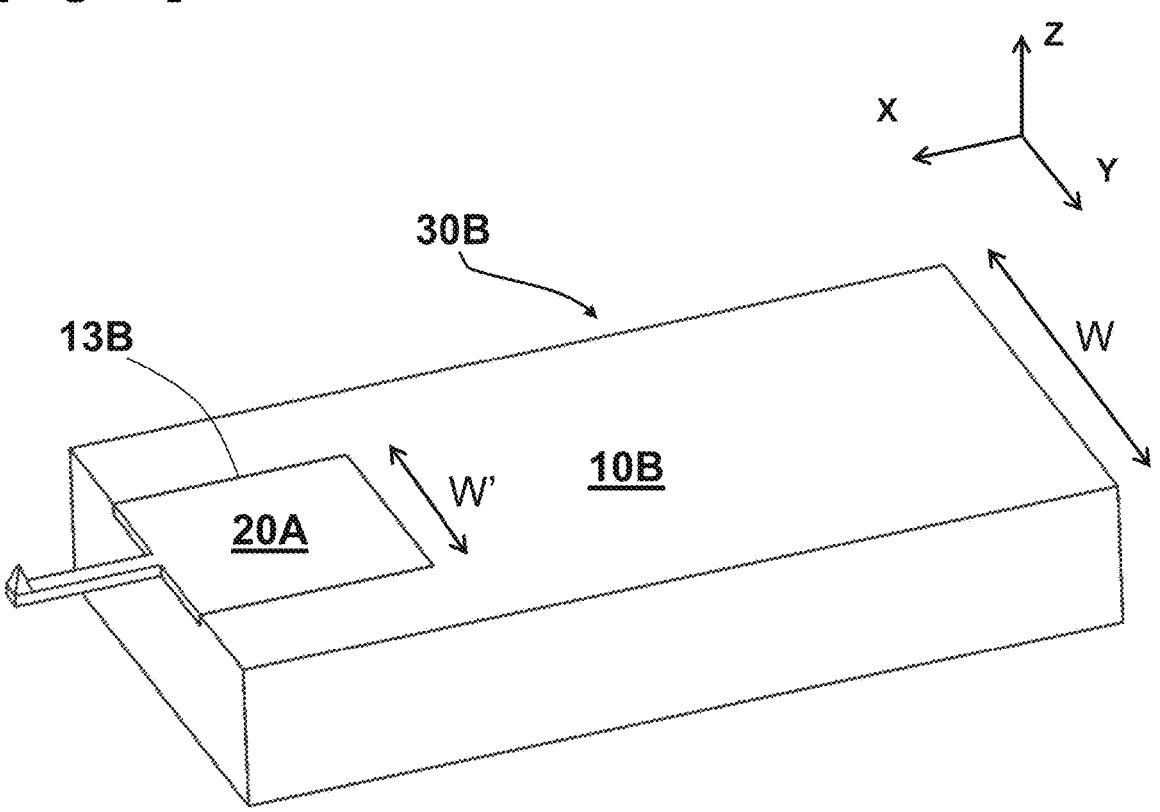
[Fig 12]
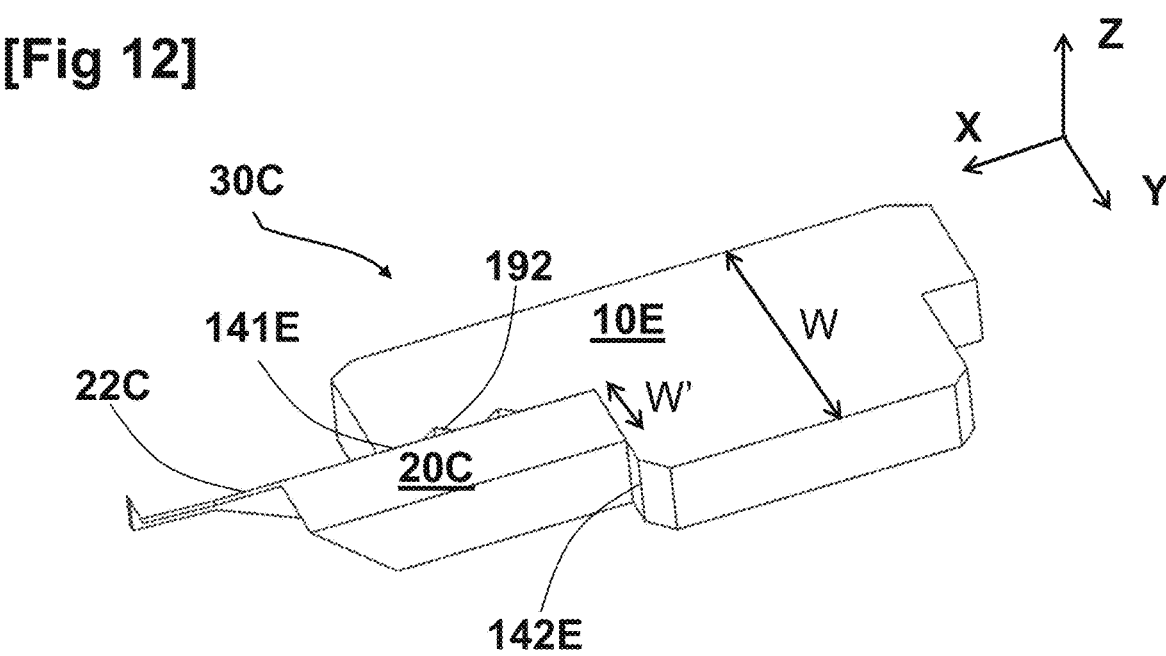

[Fig 13]
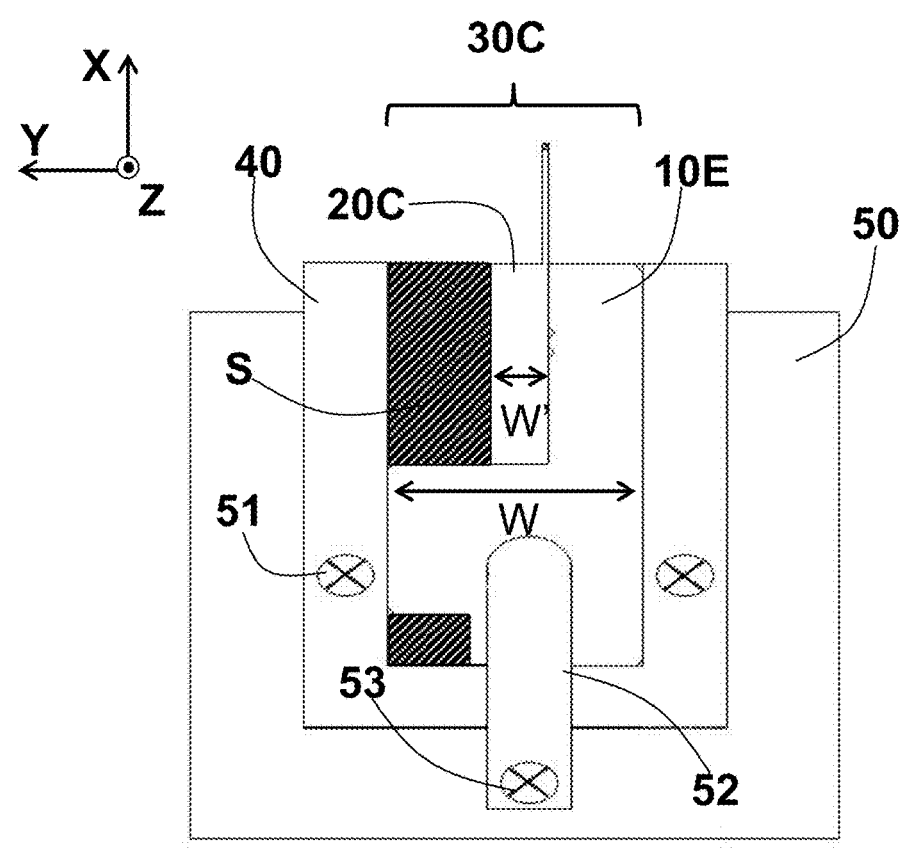
[Fig 14 ]
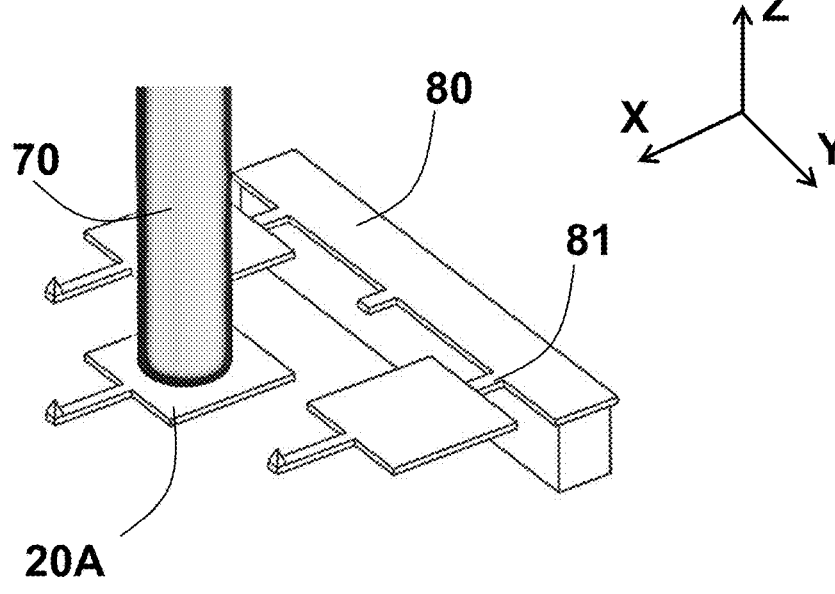

[Fig 15]
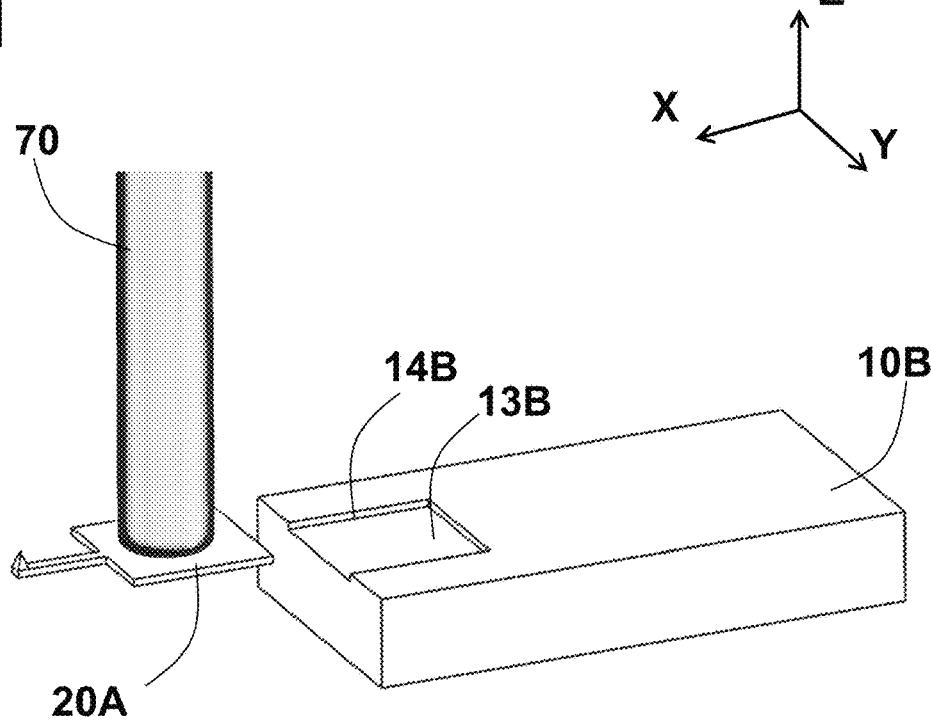
[Fig 16]
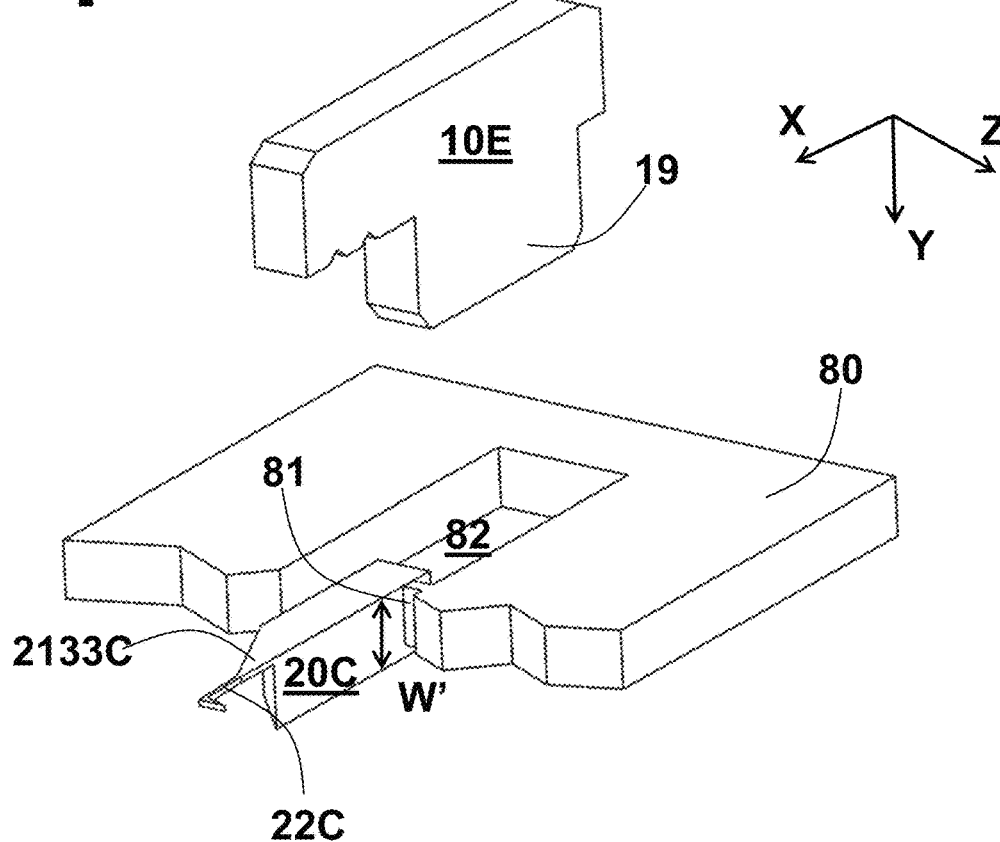

[Fig 17]
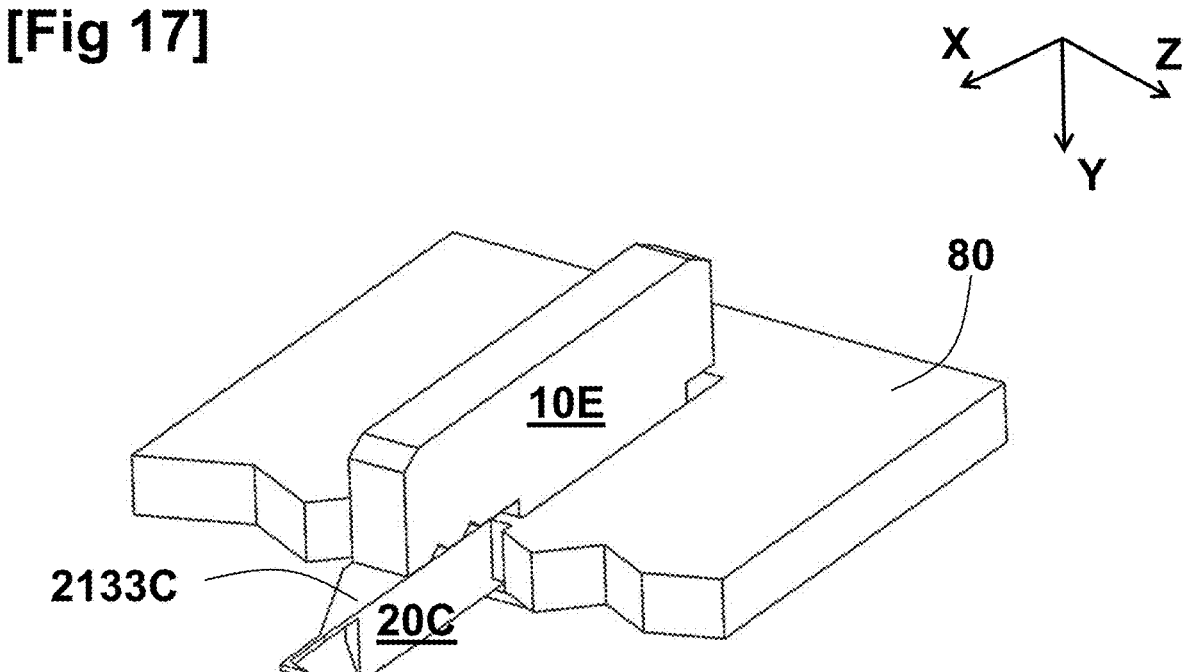

DETECTION DEVICE FOR SCANNING PROBE MICROSCOPE

CROSS-REFERENCE TO RELATED APPLICATIONS

This application is a National Stage of International patent t application PCT/EP2020/080314, filed on Oct. 28, 2020, which claims priority to foreign French patent application No. FR 2002307, filed on Mar. 9, 2020, the disclosures of which are incorporated by reference in their entirety.

TECHNICAL FIELD

The present invention relates to a detection device for a scanning probe microscope, to a process for manufacturing this detection device, and to a scanning probe microscope comprising such a detection device.

BACKGROUND

Scanning probe microscopy, also referred to as scanning near-field microscopy, is a microscopy technique making it possible to map a relief by scanning the surface to be imaged using a point that is part of a probe. The high resolution obtained by this microscopy technique makes it possible to observe objects as small as atoms, this being physically impossible with an optical microscope irrespective of its magnification. Within a few decades, scanning probe microscopy has become an indispensable tool for the metrology of surfaces and for scientific research, notably in the development of nanotechnologies and the semiconductor industry.

Among the various types of scanning probe microscope, a distinction is made for example between the atomic force microscope (or AFM), the scanning tunneling microscope (or STM), the scanning near-field optical microscope (or SNOM), which makes use of light in the infrared or terahertz range. Each of these types of scanning probe microscope utilizes specific physical properties to map a relief. Thus, the atomic force microscope utilizes the repulsion force between the electron clouds of the atoms of the surface to be imaged, on the one hand, and the electron clouds of the atoms of the tip, on the other hand. Depending on the parametrization, the user may also measure the attraction forces acting between the tip and the sample. The scanning tunneling microscope, for its part, measures the topography using the tunneling current appearing between a conductive tip and the conductive surface to be mapped. The scanning near-field optical microscope utilizes the presence of evanescent optical waves at the immediate periphery of a transparent surface, these optical waves being captured or scattered by the scanning probe. A distinction should be made between the quantity of interest and the negative feedback method to keep the tip-surface distance constant. The negative feedback is always provided by the forces at surface points, like in AFM.

What these various scanning probe microscopes have in common is the movement of a very fine tip over a surface. This movement is provided by nanometer-resolution actuators, for example of piezoelectric type. The associated electronics makes it possible to vertically control the position of the tip depending on the relief of the surface, but also to read a physical size that differs depending on the type of microscope.

Document EP0444697 describes more specifically an atomic force microscope. As has already been indicated, atomic force microscopy is a scanning probe microscopy technique. More particularly, atomic force microscopy utilizes a scanning technique that was developed at the beginning of the 1980s and makes it possible to achieve an atomic-scale resolution. Unlike scanning tunneling microscopy, atomic force microscopy is not limited to forming images of conductive surfaces, thereby making it suitable for insulating materials, semiconductors or even biological samples. This technique can be applied in numerous fields of pure and applied research, but also in the microelectronics industry. A general introduction to the principles of AFM is provided by the article by F. J. Giessibl and C. F. Quate "Exploring the nanoworld with atomic force microscopy", Physics Today, December 2006, pages 44-50.

The atomic force microscope of document EP0444697 comprises a scanning probe having a support with a parallelepipedal overall shape having a certain length and a certain width, a lever extending from the support and a tip disposed at one end of this lever opposite the support. A movable plate ensures the movement of the sample with respect to the probe, thereby allowing the tip to move along the surface of this sample. When the tip moves over the sample, a laser beam is emitted by a laser measure onto the upper surface of the lever, that is to say onto the surface of the lever opposite that bearing the tip of the probe. This laser beam is deflected toward an optical measurement system. In this way, the movements of the tip that are initiated by irregularities on the surface of the sample modify the travel of the laser beam. These deflections of the laser are immediately detected and processed by the optical measurement system. In document EP0444697, the probe ("microcantilever" 111) is borne by a mount ("lever seat", 109) fixed by a screw to the rest of the atomic force microscope. The probe is secured to the mount via adhesive means. The mount thus ensures pre-alignment of the probe with the atomic force microscope. While the atomic force microscope is being used, it is sometimes necessary to change the probe, in particular when the tip of said probe is worn due to repeated contact with the surfaces of the samples. The probe is then simply removed from the mount. This is because unscrewing the mount each time the probe is changed is avoided so as not to have to adjust the pre-alignment of this mount with the atomic force microscope each time. Therefore, in this embodiment, only the probe serves as a consumable for the user.

In document EP0444697, the width of the probe is identical to the width of the mount. The positioning of the probe on the mount is thus facilitated and its retention in the atomic force microscope is ensured. However, in recent years, there has been a tendency to reduce the size of the probes in order to optimize the manufacturing costs. This is because the probes are manufactured collectively on silicon substrates using photolithography and etching techniques. These operations are expensive and the cost of a manufacturing step is distributed between the various probes of one and the same silicon substrate. The smaller the probes are, the more of them it is possible to hold on one silicon substrate, thereby reducing the unit cost of manufacture in this way. In addition, the mount is subject to restrictive standardization which tends to hold it to a certain size just to facilitate the user's handling of the probe. A standard mount has for example a mount length of 3.4 mm±0.05 mm and a mount width of 1.6 mm±0.05 mm.

Developments in the size of the mount and of the probe are therefore in opposition nowadays.

Therefore, there is a problem in making small probes compatible with mounts of a standardized size in order to ensure optimum operation of a scanning probe microscope.

SUMMARY OF THE INVENTION

The present invention aims to at least partially rectify this need.

More particularly, the present invention aims to improve the positioning of a probe of reduced size in a standardized mount of a scanning probe microscope.

A first subject of the invention relates to a detection device intended for insertion in a mount of a scanning probe microscope. The detection device comprises a probe having a support, a lever extending from the support, and a tip positioned at one end of the lever, opposite said support. Since the probe has reduced dimensions with respect to the mount, the detection device comprises an adapter secured to the probe for adapting said probe to the mount. The adapter is secured to the probe via gluing means comprising at least one glue or via joining means comprising a filler used to secure said adapter to said probe during a brazing operation.

The detection device is thus formed by two parts joined together. A first part has reduced size. It comprises the support, the lever and the tip. This first part is the core of the detection device. A second part corresponds to the adapter. The imprint of the adapter is close to a standard probe. This adapter then makes it possible to adapt the dimensions of the probe to those of the mount. The probe is thus wedged in the mount, this preventing any relative movement thereof with respect to said mount. The alignment of the probe with respect to the laser for detecting the movements of the lever is then ensured and the operation of the microscope is optimized. Moreover, the use of smaller probes contributes to lowering the production costs of these probes, thereby making it possible to provide the user of the microscope with consumables at more appealing overall prices. In addition, the use of smaller probes makes it possible to use more advanced micro-fabrication techniques and thus to obtain better probe performance whilst still keeping the price per probe comparable to the existing price.

In a particular embodiment, the support comprises a base intended to be supported by the mount, this base having a base length L' and a base width W, such that L'>W'. "Base intended to be supported by the mount" is intended to mean a surface of the support that will rest directly or indirectly (via the adapter) on the mount. The adapter has an adapter width W at least 1 mm greater than the base width W of the probe.

In this way, the adapter makes it possible to compensate the reduced dimensions of the probe to ensure that the detection device is retained well in the mount. In a particular embodiment, the adapter has a width W of 1.6 mm and the base has a width W' of 0.5 mm.

In a particular embodiment, the probe is secured to the adapter at the base of the probe. Thus, in a scanning probe microscope, the base is borne by the mount by way of the adapter. It is then possible to manufacture adapters of simple design to improve the retention of the probe in the mount.

In another particular embodiment, the adapter comprises a recess intended to receive said probe. In this way, it is possible to "slot" the probe in the adapter so as not to combine the thickness of the probe with that of the adapter in the detection device. The optical path of the detection laser is thus preserved, as it cannot be corrected around an excessively large thickness. By providing a recess in the adapter, it is possible to regulate the overall thickness of the detection device more easily.

The adapter preferably has a thickness e and the recess passes through said thickness e. Thus, the length of the recess is at a maximum and it corresponds to the thickness e of the adapter. The probe thus completely slots in the recess. It is thus possible for the tip of this probe to be in a standard plane without needing to modify the optical path of the detection laser.

The support of the probe preferably has a probe support thickness e' and said probe support thickness e' is identical to the thickness e of the adapter. It is thus possible to produce the probe and the adapter in one and the same silicon substrate of thickness e, e'. The manufacturing costs are then improved. In addition, with identical thicknesses, the probe support can be a precise continuation of the adapter, without a surface offset.

In another particular embodiment, the recess gives the adapter the overall shape of an L or the overall shape of a U. The L shape of the adapter allows joining to be done from the side to form the detection device. The U shape makes it easier to guide the probe with respect to the adapter when said probe is being joined to said adapter.

In another particular embodiment, the gluing means comprise an epoxy glue or an acrylic glue. In a known manner, an epoxy glue comprises a resin and a curing agent. The epoxy glue has considerable mechanical strength irrespective of the climatic conditions. The acrylic glue is preferably a UV glue that crosslinks under the action of ultraviolet radiation.

In another particular embodiment, the gluing means comprise at least one discharge slot in said detection device, said discharge slot being intended to discharge excess glue. This ensures that the presence of an excessively large amount of glue does not disrupt the join between and positioning of the probe and the adapter.

In another particular embodiment, the material of the adapter is selected from a list of materials comprising:
- a silicon substrate;
- a metal;
- a semiconductor;
- a ceramic;
- a polymer;
- a fiberglass-reinforced epoxy resin of FR4 type.

The material of the adapter can thus be identical to or different from the material of the probe.

In another particular embodiment, the adapter comprises at least one electrical track. This electrical track can ensure that the probe and the rest of the scanning probe microscope are electrically continuous. This makes it possible to exchange electrical signals between this probe and said microscope. As a variant, electromagnetic waves are exchanged, the electrical track forming part of a coplanar waveguide.

In another particular embodiment, the support has another surface referred to as upper surface, opposite the base in the support. The lever of the probe continues said upper surface. Probes referred to as conventional probes are thus formed. These conventional probes have a lever continuing the support substantially along an axis of symmetry of this support.

In another particular embodiment, the support has a lateral surface connecting the upper surface of the support to the base of said support, the lever continuing said lateral surface. Probes referred to as lateral probes having tips on the side are thus formed. These lateral probes make it possible to produce levers with very long tips made collectively on one silicon substrate.

In another particular embodiment, the lateral surface of the support of the probe is secured to the adapter in the recess.

A second subject of the invention relates to a process for manufacturing a detection device intended for insertion in a mount of a scanning probe microscope. The manufacturing process has a step of producing a probe by physical etching, such as plasma etching ORIE ("Deep Reactive Ion Etching"), of a silicon substrate. The probe has a support, a lever extending from the support, and a tip positioned at one end of the lever, opposite said support. Since the probe has reduced dimensions with respect to the mount, the manufacturing process also comprises a step of producing an adapter intended to be secured to the probe to adapt said detection device to the mount. Lastly, the manufacturing process comprises a step of securing the probe to the adapter via gluing means or via joining means comprising a filler used to secure said adapter to said probe during a brazing operation.

The manufacturing process thus proposed makes it possible to simply and practically form a detection device adaptable to a standard mount. The probe and the adapter are made independently in dedicated production processes. This makes it possible to optimize the associated production process for each of these elements.

The manufacturing process preferably comprises, prior to the securing step, a guiding step between the adapter and the probe. It is thus possible to provide guide means between the adapter and the probe. These guide means are for example a trench in the silicon substrate of the probe. This trench will make it possible to let the adapter pass through such that it is glued against the probe while said probe is being joined to said adapter.

The manufacturing process preferably comprises a step of separating the probe from the silicon substrate. The detection device is thus formed with a view to storing it and then using it as a standard sensor for a scanning probe microscope.

The adapter is preferably made by physical etching, such as plasma etching ORIE, of a silicon substrate.

Another subject of the invention relates to a scanning probe microscope having a detection device in accordance with the first subject of the invention, such as an atomic force microscope.

BRIEF DESCRIPTION OF THE DRAWINGS

The present invention will be better understood upon reading the detailed description of embodiments, taken by way of completely non-limiting example and illustrated by the appended drawings, in which:

FIG. 1 is a schematic view in perspective of an adapter according to a first embodiment of the adapter;

FIG. 2 is a schematic view in perspective of an adapter according to a second embodiment of the adapter;

FIG. 3 is a schematic view in perspective of an adapter according to a third embodiment of the adapter;

FIG. 4 is a schematic view in perspective of an adapter according to a fourth embodiment of the adapter;

FIG. 5 is a schematic view in perspective of an adapter according to a fifth embodiment of the adapter;

FIG. 6 is a schematic view in perspective of an adapter according to a sixth embodiment of the adapter;

FIG. 7 is a schematic view in perspective of a probe according to a first embodiment of the probe;

FIG. 8 is a schematic view in perspective of a probe according to a second embodiment of the probe;

FIG. 9 is a schematic view in perspective of a probe according to a third embodiment of the probe;

FIG. 10 is a schematic view in perspective of a detection device according to a first embodiment of the invention, said detection device comprising the adapter of FIG. 1 with the probe of FIG. 9;

FIG. 11 is a schematic view in perspective of a detection device according to a second embodiment of the invention, said detection device comprising the adapter of FIG. 2 with the probe of FIG. 7;

FIG. 12 is a schematic view in perspective of a detection device according to a third embodiment of the invention, said detection device comprising the adapter of FIG. 5 with the probe of FIG. 9;

FIG. 13 illustrates a part of a scanning probe microscope comprising the detection device of FIG. 12 retained in a mount of a scanning probe microscope;

FIG. 14 illustrates a step of separating the probe of FIG. 8 from a silicon substrate, according to a first process for manufacturing a detection device in accordance with FIG. 11;

FIG. 15 illustrates a step of joining the probe to the adapter after the step of FIG. 14;

FIG. 16 illustrates a step of putting the adapter of FIG. 5 in place in the probe of FIG. 7 according to a second process for manufacturing a detection device in accordance with FIG. 12;

FIG. 17 illustrates a step of joining the adapter of FIG. 5 to the probe of FIG. 9 after the step of FIG. 16.

DETAILED DESCRIPTION

The invention is not limited to the embodiments and variants that are presented, and other embodiments and variants will be readily apparent to those skilled in the art. Thus, the description below applies more particularly to an atomic force microscope. Of course, this description also applies to any other type of scanning probe microscope, such as a scanning tunneling microscope, a scanning near-field optical microscope.

In the various figures, elements that are identical or similar bear the same references.

FIG. 1 schematically shows an adapter 10A for a detection device. This adapter 10A is in the form of a rectangular parallelepiped having an adapter width W, an adapter length L, and a thickness e. In this case, the adapter width W is determined along the direction Y, the adapter length L is determined along the direction X and the thickness e is determined along the direction Z. It will be noted that, in one particular embodiment, the adapter length L is greater than the adapter width W which is itself greater than the thickness e of the adapter, such that L>W>e.

The adapter 10A has a lower surface 11A (not visible in FIG. 1). This lower surface 11A is designed to be in contact with a mount 40 of a scanning probe microscope 50 when the detection device is placed in this mount 40. The adapter 10A also has an upper surface 12A opposite the lower surface 11 A The upper surface 12A of the adapter 10A is designed to receive a probe of the detection device. Lastly, the adapter 10A comprises a lateral surface 18A of length L connecting the lower surface 11 A to the upper surface 12A.

FIG. 2 schematically shows an adapter 10B according to one embodiment variant. This adapter 10B is in the form of a rectangular parallelepiped having an adapter width W, an adapter length L, and a thickness e. The adapter width W is determined along the direction Y, the adapter length L is determined along the direction X and the thickness e is determined along the direction Z. It will be noted that, in one particular embodiment, the adapter length L is greater than the adapter width W which is itself greater than the thickness e of the adapter, such that L>W>e.

The adapter 10B has a lower surface 11 B (not visible in FIG. 2). This lower surface 11B is designed to be in contact with a mount 40 of a scanning probe microscope 50 when the detection device is placed in this mount 40. The adapter 10B also has an upper surface 12B opposite the lower surface 11B. The upper surface 12B of the adapter 10B is designed to receive a probe of the detection device. More particularly, the upper surface 12B has a recess 13B intended to receive a probe 20A, 20B, 20C. The recess 13B is in the form of a space delimited by lateral surfaces 14B and a bottom surface 15B. The bottom surface 15B is rectangular overall. In this instance, this bottom surface 15B is parallel to the upper surface 12B of the adapter 10B. The recess 13B opens out on one "of the small lateral surfaces" 16B of this adapter, that is to say on one of the lateral surfaces having a width W. The recess 13B has a depth P corresponding to the distance between the bottom surface 15B and the upper surface 12B. Here, the depth P of the recess 13B is very small with respect to the thickness e of the adapter 10B. In one particular embodiment, the depth P of the recess 13B corresponds to less than 10% of the thickness e of the adapter 10B. Lastly, the adapter 10B comprises a lateral surface 18B of length L connecting the lower surface 11 B to the upper surface 12B.

FIGS. 3 to 6 show adapters 10C, 10D, 10E, 10F, respectively, having at least one recess 13C, 13D, 13E, 13F, respectively. These recesses 13C, 13D, 13E, 13F passes through the associated adapters 10C, 10D, 10E, 10F. The depth p of the recesses 13C, 13D, 13E, 13F is thus equivalent to the thickness e of the adapters 10C, 10D, 10E, 10F.

FIG. 3 schematically shows an adapter 10C according to one embodiment variant. This adapter 10C is in the form of a rectangular parallelepiped having an adapter width W, an adapter length L, and a thickness e. The adapter width W is determined along the direction Y, the adapter length L is determined along the direction X and the thickness e is determined along the direction Z. It will be noted that, in one particular embodiment, the adapter length L is greater than the adapter width W which is itself greater than the thickness e, such that L>W>e.

The adapter 10C has a lower surface 11 C (not visible in FIG. 4). This lower surface 11 C is designed to be in contact with a mount 40 of a scanning probe microscope 50 when the detection device is placed in this mount 40. The adapter 10C also has an upper surface 12C opposite the lower surface 11 C. The upper surface 12C of the adapter 10C is designed to receive a probe of the detection device. More particularly, the upper surface 12C has the recess 13C intended to receive a probe 20A, 20B, 20C. The recess 13C is in the form of a space passing through the adapter 10C. This recess 13C opens out on the lower surface 11C of the adapter 10C and on one "of the small lateral surfaces" 16C of this adapter, that is to say on a lateral surface having a width W.

In addition, the recess 13C is delimited by three lateral surfaces 14C of the recess 13C. These lateral surfaces 14C are rectangular overall with a width W" corresponding to the thickness e of the adapter and a length L". The length L" of the lateral surfaces 14C of the recess is less than the width W of the adapter. It will also be noted that the recess is centered in the adapter with respect to an axis of symmetry X' of the adapter. This axis of symmetry X' is parallel to the direction X. In this embodiment of FIG. 3, the adapter 10C has the overall shape of a U having two legs 17C. The two legs 17C of the adapter 10C thus delimit the recess 13C.

FIG. 4 schematically shows an adapter 10D according to one embodiment variant. This adapter 10D is in the form of a rectangular parallelepiped having an adapter width W, an adapter length L, and a thickness e. The adapter width W is determined along the direction Y, the adapter length L is determined along the direction X and the thickness e is determined along the direction Z. It will be noted that, in one particular embodiment, the adapter length L is greater than the adapter width W which is itself greater than the thickness e, such that L>W>e.

The adapter 10D has a lower surface 11D (not visible in FIG. 3). This lower surface 11 D is designed to be in contact with a mount 40 of a scanning probe microscope 50 when the detection device is placed in this mount 40. The adapter 10D also has an upper surface 12D opposite the lower surface 11D. The upper surface 12D of the adapter 10D is designed to receive a probe 20A, 20B, 20C of the detection device. More particularly, the upper surface 12D has the recess 13D intended to receive a probe 20A, 20B, 20C. The recess 13D is in the form of a space passing through the adapter 10D. This recess 13D opens out on the upper surface 12D of the adapter 11 D, on the lower surface 11D of the adapter 10D, on one "of the small lateral surfaces" 16D of this adapter 10D, that is to say on a lateral surface having a width W, and on one "of the large lateral surfaces" 18D of this adapter 10D, that is to say on a lateral surface having a length L.

In addition, the recess 13D is delimited by two lateral surfaces 14D of the recess 13D. These lateral surfaces 14D are rectangular overall with a width W" corresponding to the thickness e of the adapter and a length L". The length L" of the lateral surfaces 14D of the recess 13D is less than the width W of the adapter 10D. In this embodiment of FIG. 4, the adapter 10D has the overall shape of an L. The recess 13D is thus present in a corner of the adapter 10D.

FIG. 5 schematically shows an adapter 10E according to one embodiment variant. This adapter 10E is in the form of a rectangular parallelepiped having an adapter width W, an adapter length L, and a thickness e. The adapter width W is determined along the direction Y, the adapter length L is determined along the direction X and the thickness e is determined along the direction Z. It will be noted that, in one particular embodiment, the adapter length L is greater than the adapter width W which is itself greater than the thickness e, such that L>W>e.

The adapter 10E has a lower surface 11 E (not visible in FIG. 5). This lower surface 11 E is designed to be in contact with a mount 40 of a scanning probe microscope 50 when the detection device is placed in this mount 40. The adapter 10E also has an upper surface 12E opposite the lower surface 11E. The upper surface 12E of the adapter 10E is designed to receive a probe 20A, 20B, 20C of the detection device. More particularly, the upper surface 12E has the recess 13E intended to receive a probe 20A, 20B, 20C. The recess 13E is in the form of a space passing through the adapter 10E. This recess 13E opens out on the upper surface 12E of the adapter 10E, on the lower surface 11 E of the adapter 10E, on one "of the small lateral surfaces" 16E of this adapter 10E, that is to say on a lateral surface having a width W, and on one "of the large lateral surfaces" 18E of this adapter 10E, that is to say on a lateral surface having a length L.

In addition, the recess 13E is delimited by a first lateral surface 141E and a second lateral surface 142E of the recess 13E. The first lateral surface 141E of the recess 13E is substantially parallel to the large lateral surface 18E of the adapter 10E. The second lateral surface 142E is substantially parallel to the small lateral surface 16E. These lateral surfaces 141 E, 142E are rectangular overall with a width W' corresponding to the thickness e of the adapter. In this instance, the length of the first lateral surface 141E is different from the length of the second lateral surface 142E. Thus, the length of the first lateral surface 141E is less than the length L of the adapter 10E. In addition, the length of the second lateral surface 142E is less than the width W of the adapter 10E. As a variant, the length of the first lateral surface 141 E is identical to the length of the second lateral surface 142E. In this embodiment of FIG. 5, the adapter 10E has the overall shape of an L. The recess 13E is thus present in a corner of the adapter 10E.

The adapter 10E also has another recess 13F positioned in a corner opposite that of the recess 13E but opening out on the sane large lateral surface 18E. The other recess 13F opens out on the upper surface 12E of the adapter 10E and on the lower surface 11 E of this adapter 10E. The other recess 13F also opens out on a small lateral surface opposite the small lateral surface 16E. The recess 13E and the other recess 13F define a specific part 19 of the adapter 10E having the shape of a tenon. This tenon shape is designed to enter a complementary groove 82 in a silicon substrate, with a view to joining a detection device, as is shown more particularly in FIG. 16 and in FIG. 17. The adapter 10E moreover has at least one chamfer 191 to promote the joining of the detection device. In the embodiment of FIG. 5, the adapter 10E has four chamfers 191. Lastly, the adapter 10E comprises at least one indentation 192 in the recess 13E. The indentation 192 extends over the entire thickness e of the adapter 10E. The function of this indentation 192 is to discharge any excess glue. In the embodiment of FIG. 5, the adapter 10E comprises two adjacent indentations 192 which extend from the first lateral surface 141E of the recess 13E. As a variant, there are more than two indentations present on the first lateral surface 141E. In another embodiment variant, the second lateral surface 142E also comprises at least one indentation 192. The adapter 10E has the shape of a T here.

FIG. 6 illustrates another embodiment variant of the adapter 10F. This adapter 10F corresponds to the adapter 10E of FIG. 5 with additional electric means 60, 61, 62, 63. As a consequence, the description of the adapter 10F corresponds in full to that of the adapter 10E. The adapter 10F moreover comprises at least one electrical track 60. The electrical track 60 comprises a first electric base 61 and a second electric base 62 and also an electrical connection 63 between the first electric base 61 and the second electric base 62. The first electric base 61 is positioned close to the recess 13E. The second electric base 62 is positioned close to the other recess 13F. Thus, the first electric base is designed to be in electrical communication with an electric base which is part of a probe. The second electric base is designed to be in communication with an electric base which is part of the mount of the scanning probe microscope. In the embodiment of FIG. 6, the electric means have two electrical tracks 60. As a variant, the electric means 60 may have only one track. In another embodiment variant, the electric means have more than two electrical tracks.

The adapters 10A to 10F may come from one silicon substrate. As a variant, the adapters 10A to 10F are made from a material selected from a list of materials comprising a metal cut, for example, using a laser; a semiconductor; a ceramic; a polymer made, for example, using photolithography; a fiberglass-reinforced epoxy resin of FR4 type.

The dimensions of the adapters 10A to 10F correspond to dimensions of a standardized mount. For example, the length L of the adapters 10A to 10F is 3.4 mm, their width W is 1.6 mm and their thickness is 0.315 mm.

FIGS. 7 to 9 illustrate various embodiments of a probe (20A, 20B, 20C).

FIG. 7 is thus a schematic view in perspective of a probe 20A according to a first embodiment. The probe 20A comprises a probe support 21A, a lever 22A and a tip 23A.

The probe support 21A is in the form of a plate comprising a base 211A (not visible in FIG. 7), an upper surface 212A opposite the base 211A and four lateral faces 213A connecting said upper surface 212A to the base 211 A The base of the probe support 211A has a base length L' and a base width W' with L'>W'. The probe support has a thickness e'. In the embodiment of FIG. 7, the base length L' is identical to the base width W' and the base 211A has a square shape.

The lever 22A is in the form of an elongate plate. This lever 22A extends from the probe support 21A and has the same thickness as the probe support 211A. In the embodiment of FIG. 7, the lever 22A continues the upper surface 212A and the base 211 A of the probe support. The lever 22A is centered with respect to the base width W' of the base of the probe support 211A. The lever 22A is thus placed in the continuation of an axis of symmetry X" of the probe 20A.

The tip 23A is positioned at one end of the lever 22A opposite the probe support 21 A It is present on a surface of the lever 22A so as to be able to be oriented toward the surface of the sample to be examined when the probe is placed in the mount. More specifically, the tip 23A protrudes from the surface of the lever 22A which directly continues the upper surface 212A of the probe support 21 A Here, the tip 23 A has the shape of a square-based pyramid of the diamond tip type.

FIG. 8 is thus a schematic view in perspective of a probe 20B according to a second embodiment. The probe 20B comprises a probe support 21B, a lever 22B and a tip 23B.

The probe support 21 B is in the form of a rectangular parallelepiped comprising a base 211 B (not visible in FIG. 8), an upper surface 212B opposite the base 211 B and 4 lateral surfaces 213B connecting said upper surface 212B to the base 211 B. The base of the probe support 211B has a base length L' and a base width W' with L'>W. In this instance, the base length L' is identical to the base width W and the base 211B has a square shape. In addition, the probe support 211B has a thickness e'. This probe thickness e' is greater than the probe thickness of the probe support 21 A of FIG. 7. Specifically, the probe support 21B is in two parts here: an upper part 214B having the upper surface 212B, and a lower part 215B having the base 211 B. The upper part 214B and the lower part 215B have the same width and the same length, such that these two parts continue one another precisely. These two parts 214A, 215B are made from one and the same material and then joined, for example, by gluing or by brazing. Brazing is understood to mean the operation that establishes a mechanical connection between the parts 214A, 215B. As a variant, these two parts 214A, 214B are made from different materials and then joined. The thickness of the upper part 214B and of the lower part 215B are different. Here, the thickness of the upper part 214B is much lower than the thickness of the lower part 215B.

The lever 22B is in the form of an elongate plate. This lever 22B extends from the upper part 214B of the probe support 21B and has the same thickness as this upper part 214B. More particularly, in the embodiment of FIG. 8, the lever 22B continues the upper surface 212B. The lever 22B is centered with respect to the base width W of the base of the probe support 211A. The lever 22B is thus placed in the continuation of an axis of symmetry X″ of the probe 20B.

The tip 23B is positioned at one end of the lever 22B opposite the probe support 21 B. It is present on a surface of the lever 22B so as to be able to be oriented toward the surface of the sample to be examined when the probe is placed in the mount. More specifically, the tip 23B protrudes from the surface of the lever 22B which directly continues the upper surface 212B of the probe support 21 B. Here, the tip 23B has the shape of a square-based pyramid of the diamond tip type.

FIG. 9 is a schematic view in perspective of a probe 20C according to a third embodiment. The probe 20C comprises a probe support 21C, a lever 22C and a tip 23C.

The probe support 21C is in the form of a rectangular parallelepiped comprising a base 211C (not visible in FIG. 9), an upper surface 212C opposite the base 211C and four lateral surfaces 2131 C, 2132C, 2133C connecting said upper surface 212C to the base 211C. The base of the probe support 211C has a base length L′ and a base width W′ with L′>W. In this instance, the base length L′ is greater than the base width W′ and the base 211 C has a rectangular shape. In addition, the probe support 211C has a thickness e′. In the particular embodiment of FIG. 9, the probe thickness e′ is close to the base width W′. The probe support 21C has an inclined lateral surface 2132C. This inclined lateral surface 2132C is positioned close to the lever 22C and forms, with the upper surface 212C, an edge corner 21321C which is perpendicular overall with respect to the direction X of extent of the lever 22C. The inclined lateral surface 2132C makes it possible for the probe 21 C to not interfere with the laser beam of the laser measure when it is installed in the head of the scanning probe microscope.

The lever 22C is in the form of an elongate assembly. More particularly, the lever 22C comprises a first part 221 C continuing the upper surface 212C of the probe support 21 C and a second part 222C extending from said first part 221C of the lever to the tip 23C. The first part 221C of the lever 22C has a triangular overall shape and continues a lateral surface 2133C (not visible in FIG. 9 but visible in FIG. 16) of the probe support 21C in the direction X. The probe 20C is then referred to as "lateral probe" 20C and the lever 22C in this instance is off-centered with respect to the base width W′ of the probe support 21C.

The tip 23C is positioned at one end of the lever 22C opposite the probe support 21C so as to be able to be oriented toward the surface of the sample to be examined when the probe is placed in the mount. Here, the tip 23C has a tetrahedral shape having three intersecting planes forming a point-like tip.

The levers 22A, 22B, 22C have dimensions much lower than those of the probe supports 21A, 21 B, 21C. Thus, the levers 22A, 22B, 22C have a lever length of about 0.2 mm for a lever width of 0.04 mm and a lever thickness of a few micrometers.

FIG. 10 is a schematic view in perspective of a detection device 30A according to a first embodiment of the invention. This detection device 30A comprises the adapter 10A described in FIG. 1 and the lateral probe 20C described in FIG. 9. In this instance, the lateral probe 20C is glued to the upper surface 12A of the adapter 10A More particularly, the lateral probe 20C is oriented parallel to the adapter 10A such that the lateral surface 2131C of the probe 20C is parallel to the lateral surface 18A of the adapter 10A In addition, the base 211C of the lateral probe 20C rests entirely on the upper surface 12A of the adapter 10A and is flush with an edge corner 121 A of the adapter 10A The lever 22C then projects beyond the adapter 10A.

FIG. 11 is a schematic view in perspective of a detection device 30B according to a second embodiment of the invention. In this second embodiment, the detection device 30B comprises the adapter 10B described in FIG. 2 and the probe 20A described in FIG. 7. The probe 20A is thus inserted and glued in the recess 13B of the adapter 10B, the dimensions of said probe 20A being adapted to said recess 13B. The lever 22A of the probe 20A then projects beyond the adapter 10B.

FIG. 12 is a schematic view in perspective of a detection device 30C according to a third embodiment of the invention. In this third embodiment, the detection device 30C comprises the adapter 10E described in FIG. 5 and the lateral probe 20C of FIG. 9. In this instance, the lateral probe 20C is glued to the upper surfaces 141E and 142E of the adapter 10E. As has already been described above, two discharge slots 192 make it possible to discharge any excess glue. The dimensions of the probe 20C are adapted to the recess and the lever 22C of said probe 20C projects beyond the adapter 10E. Moreover, since the thickness e′ of the probe 20C is identical to the thickness e of the adapter 10E, the upper surface 212C of the lateral probe 20C is in the same plane as the upper surface 12E of the adapter and the lower surface 211 C of said lateral probe 20C is in the same plane as the lower surface 11 E of said adapter 10E.

To realize the gluing of the detection devices 30A, 30B, 30C, an epoxy glue is used in one particular embodiment. The epoxy glue is a thermosetting liquid polymer. From a certain temperature, this epoxy glue polymerizes and solidifies, thereby making it possible to hold the adapter well on the probe in the various detection devices 30A, 30B, 30C. As a variant, the glue is an acrylic glue. The acrylic glue preferably polymerizes under the action of ultraviolet radiation.

As a variant, to realize the brazing of the detection devices 30A, 30B, 30C, joining means comprising a filler, such as gold, are used. This filler is positioned between the adapter and the probe in the various detection devices 30A, 30B, 30C in order to then be used to secure said adapter to said probe during a thermal operation and/or during a mechanical operation. When gold-based filler is used, the operation realized is thermocompression. It will be noted that the filler may be positioned on the adapter or on the probe. As a variant, the filler is positioned both on the adapter and on the probe.

FIG. 13 illustrates a part of a scanning probe microscope comprising the detection device 30C of FIG. 12. This scanning probe microscope is an atomic force microscope.

The scanning probe microscope of FIG. 13 has a head 50, a mount 40 fixed to said head 50 by two screws 51, an elastic retaining blade 52 fixed to said head by a screw 53. The mount 40 has the overall shape of a U and the detection device 30C is placed inside this mount. The mount has for example a mount length of 3.4 mm+0.05 mm and a mount width of 1.6 mm+0.05 mm. More particularly, the detection device 30C rests on a surface S of the mount 40, said surface S being shown in gray in FIG. 13. The base of the probe 20C of the detection device 30C is thus supported by the mount on this surface S. The probe 20C has reduced dimensions with respect to the mount 40. The adapter 10E thus makes it possible to adapt the size of this probe 20C to the mount 40. In a particular embodiment, the width W of the base of the probe is at least 1 mm less than the adapter width W. By way of example, it is possible to use a lateral probe of width 0.5 mm and an adapter of width 1.6 mm. The adapter width W is understood in this instance to mean the maximum width W of this adapter. The dimensions of the adapter 10E are thus determined so as to wedge the detection device 30C in the mount 40. Also provided is an elastic retaining blade 52 designed to press the detection device 30C against the surface S of the mount 40. The probe 20C is thus completely aligned in the mount 40 in the directions X and Y and the scanning probe microscope can operate in an optimum manner. If it is necessary to change the probe, all the user needs to do is decouple the elastic blade 52 from the detection device 30C and take this device 30C out of the mount 40 in its entirety. It will be noted that the head 50 of the microscope confers a certain angle on the detection device. Thus, when the surface to be imaged is being scanned by the tip of the detection device, the lever of this device is not completely parallel to this surface to be imaged. This lever forms an angle of between 7° and 13° with respect to said surface to be imaged.

Another subject of the invention relates to a process for manufacturing a detection device.

FIGS. 14 and 15 illustrate a process for manufacturing the detection device 30B of FIG. 11. This manufacturing process comprises a step of producing the probe 20A by physical etching of a silicon substrate 80. The step of producing the probe 20A preferably makes use of plasma etching ORIE. A plurality of probes 20A may thus be manufactured in series from one and the same substrate. Here, the thickness of the probe 20A corresponds to the thickness of the silicon substrate. Once the contours of the probe 20A have been produced, it is retained on the substrate by a sacrificial connecting element 81. This sacrificial connecting element 81 is intended to be separated from the probe 20A when it is withdrawn. In the embodiment of FIG. 14, the probe 20A is withdrawn by a PPT (Pick and Place Tool) 70. In this instance, the PPT 70 is in the form of a tube which is positioned on the upper surface of the probe 20A to be connected thereto. This connection is produced, for example, by establishing a vacuum in the tube of the PPT 70. The probe 20A is then taken by the PPT 70 to the recess 13B of the adapter 10B to be secured there to the adapter 10B via gluing means. The recess 13B preferably comprises guide means (not shown) for guiding the probe 20A into the adapter 10B. These guide means are, for example, guide grooves present in the lateral surfaces 14B of the recess 13B.

FIGS. 16 and 17 illustrate another process for manufacturing the detection device 30C of FIG. 12. This manufacturing process comprises a step of producing the probe 20C by physical etching of a silicon substrate 80. The step of producing the probe 20C preferably makes use of plasma etching ORIE. A plurality of probes 20C may thus be manufactured in series from one and the same substrate 80. In this instance, the probe is rotated by 90° in the substrate, thereby making it possible to increase the number of probes manufactured. Thus, it is the width W of the probe that corresponds to the thickness of the silicon substrate. By way of example, this width W' is 0.5 mm. Once the contours of the probe 20C have been produced, it is retained on the substrate by a sacrificial connecting element 81. This sacrificial connecting element 81 is intended to be separated from the probe 20B. It will also be noted that a groove 82 is made in the silicon substrate 80. In the embodiment of FIG. 16, the adapter 10E is brought up to the silicon substrate 80. The adapter 10E has been made beforehand. It has for example been made from the same silicon substrate 80 as the probe 20C by physical etching, such as plasma etching ORIE. As a variant, it was made from another silicon substrate. In another variant, the adapter 10E was made by a different manufacturing process than that of the probe 20C. The tenon-shaped part 19 of the adapter 10E is brought above the groove 82. In FIG. 17, this tenon-shaped part 19 is inserted in the groove 82 and the adapter 10E is positioned against the probe 20A to be secured there by gluing means. The groove 82 acts as a guide for the adapter 10E with respect to the probe 20C. The probe 20C is then separated from the silicon substrate 90 via the sacrificial connecting element 81, thereby releasing the entirety of the detection device 30C. Said detection device may then be placed in a storage area with a view to being used ultimately in a scanning probe microscope.

It will be noted that the chamfers 1910f the adapter 10E promote the insertion of the tenon-shaped part 19 in the groove 82.

It will also be noted that the recess 13F promotes stable positioning of the adapter 10E with respect to the silicon substrate 80 while the glue bonding the probe and the adapter sets.

The manufacturing processes thus proposed in FIGS. 14 to 17 also have a curing step with a view to setting the glue used to retain the probe on the adapter.

The processes make it possible to simply and practically form detection devices adaptable to a standard mount of a scanning probe microscope.

The invention is not limited to the embodiments and variants that are presented, and other embodiments and variants will be readily apparent to those skilled in the art.

Thus, the lateral probe 20C of FIG. 9 has been connected to the adapter 10E of FIG. 5. In a preferred embodiment, this connection is realized using a Pick and Place Tool. As a variant, the lateral probe 20C is connected to any adapter 10A-10D and 10F.

Thus, the conventional probe 20A of FIG. 7 has been connected to the adapter 10B of FIG. 2. As a variant, the conventional probe 20A is connected to any adapter 10A and 10C-10F.

Thus, the conventional probe 20B of FIG. 8 is connected to any adapter 10A-10F.

Thus, the adapter 10E comprises multiple recesses 13E, 13F so as to be adapted to the probe 20C. As a variant, the adapter 10E comprises any other complementary shape to the probe 20C, for example puzzle-type shapes.

Thus, to secure the adapter 10E to the probe 20C, said adapter 10E is positioned in the groove 82 in a vertical movement (direction Yin FIG. 16) perpendicular overall with respect to the silicon substrate 80. As a variant, in the embodiment of FIG. 3 in which the adapter has a U shape, the adapter 10C is in addition moved horizontally in the direction X of FIG. 16 so as to be push-fitted in the probe.

Thus, the glue used to join the probe and the adapter is electrically conductive. It is then possible to connect the adapter 10F of FIG. 6 to a probe having a tip provided with an electrical track. The electrically conductive glue ensures that said probe and said adapter are electrically continuous. The current in the probe may be alternating current or direct current.

Thus, the glue used to join the probe and the adapter is compatible with the ultra-high vacuum. The detection device is then designed to operate in an ultra-high vacuum chamber of a microscope.

Thus, in FIG. 13 the support of the probe 20C stops precisely at the limit of the surface S of the mount 40. As a variant, the support of the probe 20C extends beyond the surface S of the mount 40. In another variant, the support of the probe 20C is recessed with respect to the limit of the surface S of the mount 40.

Thus, in FIGS. 7 to 17, the tip of the probe is shown as being sharp. As a variant, the tip of the probe has a spherical shape. This type of rounded tip is used for specific applications, such as biological metrology.

Lastly, the detection device has been illustrated as a component of a conventional atomic force microscope. As a variant, the atomic force microscope is dynamic and the lever of the device is vibrated in one of its flexural eigenmodes. As a variant, the tip of the detection device is recessed close to the surface to be scanned.

The invention claimed is:

1. A detection device intended for insertion in a mount of a scanning probe microscope, said detection device comprising a probe, having:
   a support;
   a lever extending from the support;
   a tip positioned at one end of the lever, opposite said support;
   wherein since the probe has reduced dimensions with respect to the mount, the detection device further comprises an adapter secured to the probe configured for adapting said probe to the mount, wherein said adapter is secured to said probe via gluing means comprising at least one glue or via joining means comprising a filler used to secure said adapter to said probe during a brazing operation, and
   wherein the support of the probe comprising a base intended to be supported by the mount, said base having a base length L' and a base width W', such that L'>W', wherein said adapter has an adapter width W at least 1 mm greater than the base width W' of said support of the probe, and said adapter presents a width less than 1.6 mm.

2. The detection device as claimed in claim 1, wherein the probe is secured to the adapter via the base of said probe, said base then being supported by the mount by way of said adapter.

3. The detection device as claimed in claim 1, wherein the adapter comprises a recess intended to receive said probe.

4. The detection device as claimed in claim 3, wherein the adapter having a thickness e, and wherein the recess passes through said thickness e of the adapter.

5. The detection device as claimed in claim 3, wherein a lateral surface of the support of the probe is secured to the adapter in the recess.

6. The detection device as claimed in claim 1, wherein the gluing means comprise an epoxy glue or an acrylic glue.

7. The detection device as claimed in claim 1, wherein the material of the adapter is selected from a list of materials comprising:
   a silicon substrate;
   a metal;
   a semiconductor;
   a ceramic;
   a polymer; and
   a fiberglass-reinforced epoxy resin of FR4 type.

8. The detection device as claimed in claim 1, wherein the adapter comprises at least one electrical track.

9. The detection device as claimed in claim 1, wherein the support of the probe has another surface referred to as an upper surface, opposite the base, the lever of the probe continuing said upper surface.

10. The detection device as claimed in claim 9, wherein the support of the probe has a lateral surface connecting the upper surface of the support to the base, the lever of the probe continuing said lateral surface.

11. A scanning probe microscope having the detection device as claimed in claim 1.

12. A detection device intended for insertion in a mount of a scanning probe microscope, said detection device comprising a probe, having:
   a support;
   a lever extending from the support; and
   a tip positioned at one end of the lever, opposite said support;
   wherein since the probe has reduced dimensions with respect to the mount, the detection device further comprises an adapter secured to the probe configured for adapting said probe to the mount, wherein said adapter is secured to said probe via gluing means comprising at least one glue or via joining means comprising a filler used to secure said adapter to said probe during a brazing operation, and
wherein said detection device further comprises at least one discharge slot, said at least one discharge slot being intended to discharge excess glue.

13. A scanning probe microscope having the detection device as claimed in claim 12.

\* \* \* \* \*